Nov. 22, 1966    C. A. ANDERSON    3,286,514
TOTAL PRESSURE TRANSDUCER
Filed March 20, 1964

INVENTOR
CURTIS A. ANDERSON
BY *Joseph A. Hill*
ATTORNEY 3,286,514
TOTAL PRESSURE TRANSDUCER
Curtis A. Anderson, Cincinnati, Ohio, assignor to the United States of America as represented by the Secretary of the Army
Filed Mar. 20, 1964, Ser. No. 353,639
4 Claims. (Cl. 73—88.5)

The invention described herein may be manufactured and used by or for the Government for governmental purposes without the payment to me of any royalty thereon.

A difficult problem arises in the taking of pressure measurements in material masses with the various pressure measuring devices heretofore developed. These devices have been unable to provide such measurements without introducing into the material mass differences in pressure due to the presence of the measuring device. It has been determined that ideally the moduli of elasticity and rigidity of a pressure transducer should match precisely these moduli of the material mass surrounding the transducer. Then the pressures present within the material mass would be the same with or without the measuring device being there. In the device herein disclosed, the above-stated ideal is approximated by enclosing a pressure sensitive transducer within a pliable liquid filled envelope.

An object of this invention is therefore to provide a device for measuring pressure within a material mass which does not introduce new pressures in the material mass at the point of measurement.

Other objects will become apparent from the following description and accompanying drawings taken in connection with the accompanying claims.

Figure 1:
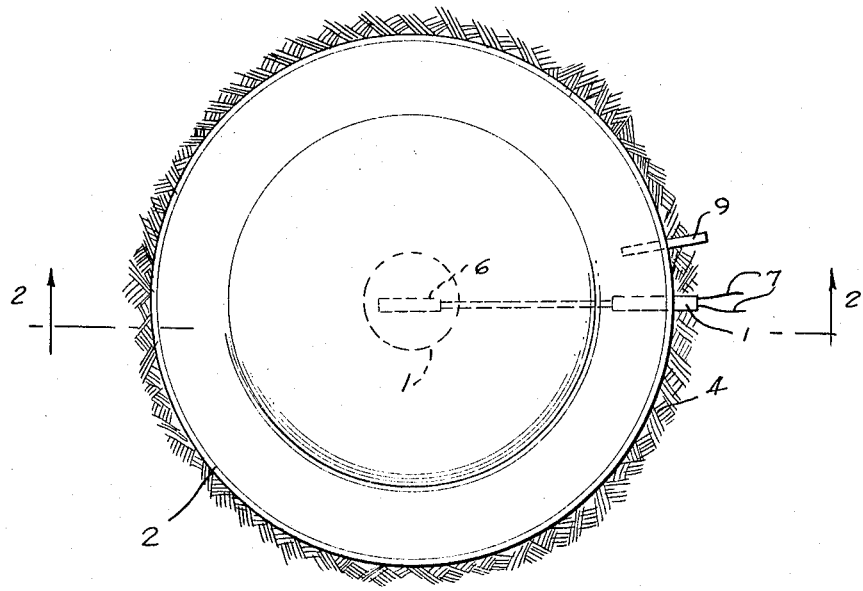
Figure 2:
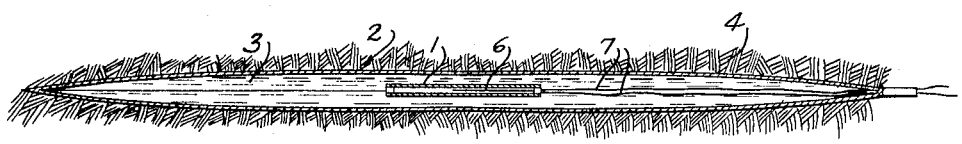

For a fuller understanding of the nature and objects of the invention as well as for specific fulfillment thereof, reference should be had to the following detailed description and the accompanying drawings in which:

FIG. 1 is a plan view of the pressure measuring device; and
FIG. 2 is a view taken on the line 2—2 of FIG. 1.

With reference to FIGS. 1 and 2, the particular embodiment of the invention herein described consists of a pressure sensitive element 1 such as a transducer which is enclosed within a pliable sealed envelope 2 which is filled by a liquid 3. The device is placed in material in which the pressures are desired to be measured. Wires 5 connect the device with an appropriately calibrated instrument (not shown) by which the pressure measurements may be read.

The pressure sensitive element 1 may be one of several such elements such as a capacitance type transducer, a piezo-electric element or a strain gage.

The thin sealed envelope 2 may be of any material and of any wall thickness or other dimension. The material is ideally made of a malleable and tough metal, preferably in the vicinity of a ratio of material thickness to material width or breadth of 1 to 1000. The overall dimensions of the sealed envelope 2 are ideally in the vicinity of ratio of thickness to width or breadth of 1 to 50. The envelope 2 is ideally featheredged at its perimeter, gradually tapering from a maximum thickness at its center.

The liquid 3 may be of any type but is ideally one low in thermal coefficient of expansion, low in freezing point, and high in incompressibility. No air or gas should be allowed within the sealed pressure envelope 2 for such air or gas will impair the transmission of pressure from the envelope 2 to the sensing element 1.

The subject device, as described, acts to transmit the total pressure within a material mass in which it is placed via the liquid 3 to the sensing element 1. As the envelope 2 and liquid 3 are not rigid in any plane and are sufficiently flexible to conform to the volume within a material mass, the original pressures are virtually undisturbed by the presence of the device within a material mass.

The subject device was conceived to apply to material mass internal pressure measurements. However, it is also applicable to measuring gas and liquid pressures without modification and thereby becomes a universal pressure measuring transducer for use in any form of material. Furthermore, if absolute pressures are desired to be measured, the liquid 3 within the envelope 2 may be sealed under pressure, which causes the sensing element 1 to be positively compressed as an initial reference.

A specific embodiment of the invention was embedded in a volume of soil and used to measure the total pressure due to the mechanical soil grain pressure and the liquid pressure of the water in the voids between the soil grains. In such application, the transducer transmits the total pressure in the soil which is against the exterior of the envelope through the liquid within the envelope to the sensing element. The thin diaphragm of the sensing element deflects under this transmitted pressure and the strain gage changes in electrical resistance. This change in electrical resistance is measured, and through calibration of the transducer reveals the total pressure in the soil mass.

In this specific embodiment, the envelope 2 is made of two 4-inch diameter circular sheets of brass, each 0.002 inch thick which are soldered together in pressure tight fashion at their perimeters. The pressure sensing element 1 is a 1/16 inch slice of 3/4 inch outside diameter stainless steel tubing with 1/16 inch walls, to which a 1/32 inch thick stainless steel diaphragm is welded to enclose one end, and to which a 0.005 inch thick stainless steel diaphragm is welded to enclose the other end. On the inside face of the thin diaphragm is cemented an electrical resistance type strain gage 6. The leads 7 of this gage are brought out through a sealed opening through the wall of the pressure sensitive element 1, the liquid 3, and out through the lead wire seal 8. The electrical lead wires 7 are #36 copper wire insulated with waterproof plastic. The lead wire seal 8 is a metal tube filled with sealing compound.

The envelope 2 is filled with a liquid 3 solution of 70% water and 30% glycol. The liquid 3 is introduced into the envelope 2 through a filling tube 9 which is made of soft copper tubing. The inside diameter of the filling tube 9 is the same as the outside diameter of a hypodermic needle which is used to insert the liquid 3 into the envelope 2. The filling tube 9 is pinched shut as the needle is withdrawn and the excess tubing is snipped off.

I claim:
1. A pressure measuring device for embedment in a material mass comprising:
 (a) a sealed, resilient, disk-shaped envelope;
 (b) a liquid contained within said envelope;
 (c) a pressure sensing element responsive to the internal pressures of said material mass immersed in said liquid; and
 (d) electrical conductor means connected to said pressure sensing element.
2. The device of claim 1 wherein the liquid within the envelope is pre-pressurized when it is sealed within the envelope.
3. A pressure measuring device for embedment in a material mass comprising:
 (a) a pliable, sealed envelope having a maximum thickness centrally thereof and tapering to a minimum thickness at an edge thereof;
 (b) a liquid contained within said envelope;
 (c) a pressure responsive transducer responsive to the internal pressure of said material mass immersed in said liquid; and

(d) electircal conductor means connected to said transducer and projecting externally of said envelope for connection to an indicating means.

4. A pressure measuring device for embodiment in a material mass having a modulus of elasticity and modulus of rigidity corresponding to the material mass comprising:
  (a) a flexible, sealed envelope having a maximum thickness centrally thereof and tapering to minimum thickness at the edge thereof;
  (b) a liquid contained within said envelope having a low thermal coefficient of expansion, low freezing point and high incompressibility;
  (c) a pressure responsive transducer immersed in said liquid; and
  (d) electrical conductor leads connected to said transducer and projecting externally of said envelope for connection to an indicating means whereby said pressure measuring device embedded in the material mass records internal pressures of said material mass without affecting the homogeneity of the material mass.

References Cited by the Examiner
UNITED STATES PATENTS

| | | | |
|---|---|---|---|
| 2,336,500 | 12/1943 | Osterberg | 73—88.5 X |
| 2,569,987 | 10/1951 | Frondel | 73—398 X |
| 2,725,548 | 11/1955 | Harris | 73—398 X |
| 3,198,013 | 8/1965 | Erdely | 73—398 |

RICHARD C. QUEISSER, *Primary Examiner.*

CHARLES A. RUEHL, *Assistant Examiner.*